United States Patent [19]
Replin

[11] 3,982,576
[45] Sept. 28, 1976

[54] TIRE STRUCTURE AND METHOD
[75] Inventor: Henry Replin, Denver, Colo.
[73] Assignee: Vector Wheel Corporation, Denver, Colo.
[22] Filed: Aug. 9, 1974
[21] Appl. No.: 495,936

[52] U.S. Cl............................ 152/155; 152/356; 152/359
[51] Int. Cl.² ......................................... B60C 9/02
[58] Field of Search .......................... 152/354–359, 152/5, 155, 156, 246–250

[56] References Cited
UNITED STATES PATENTS

| | | | |
|---|---|---|---|
| 1,502,908 | 7/1924 | Cozatt.................................. | 152/5 |
| 3,010,504 | 11/1961 | Polhemus............................ | 152/354 |
| 3,675,702 | 7/1972 | Schroeder........................... | 152/354 |

FOREIGN PATENTS OR APPLICATIONS

| 1,041,576 | 6/1953 | France................................. | 152/5 |

Primary Examiner—Robert B. Reeves
Assistant Examiner—John P. Shannon
Attorney, Agent, or Firm—Thomas W. O'Rourke

[57] ABSTRACT

An improved tire structure and method in which, supplementary to the conventional tire structure, a programmed load-transferring configuration is provided at each tire sidewall from an inner annular member, preferably the bead area, to an outer annular member, preferably the tread area. The two annular members are interconnected by elongated connecting members which join the inner annular member to the outer annular member essentially independently of the conventional tire structure. Preferably, the structure is provided with an apex of two connecting members at each connection to the outer annular member to provide improved torque application in both directions.

7 Claims, 5 Drawing Figures

U.S. Patent   Sept. 28, 1976   3,982,576
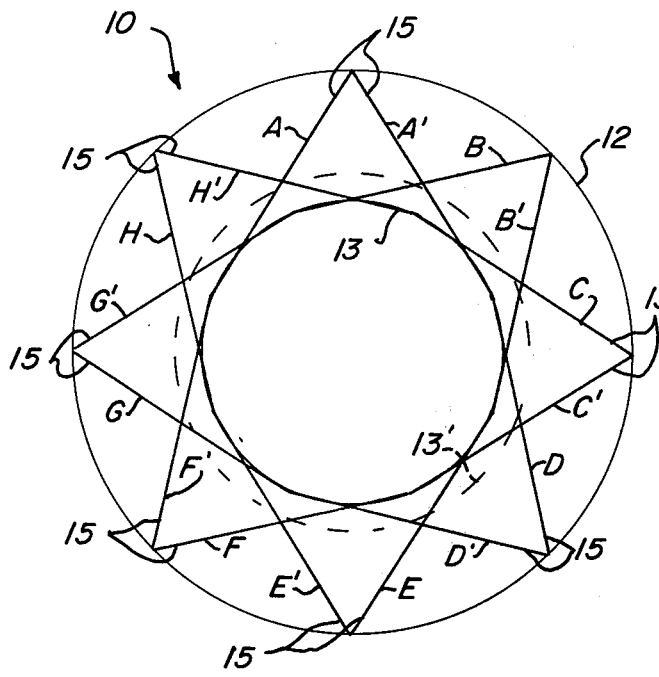
Fig_1
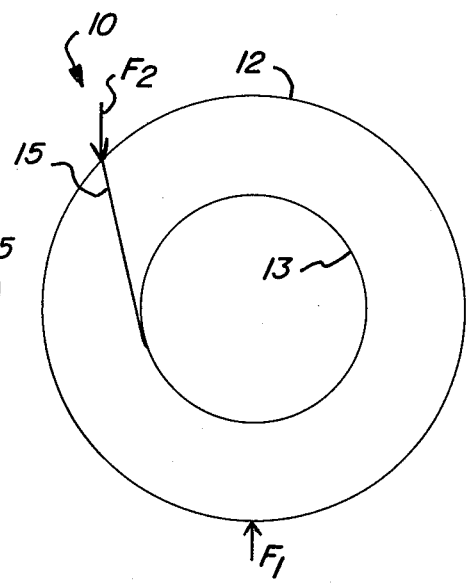
Fig_2
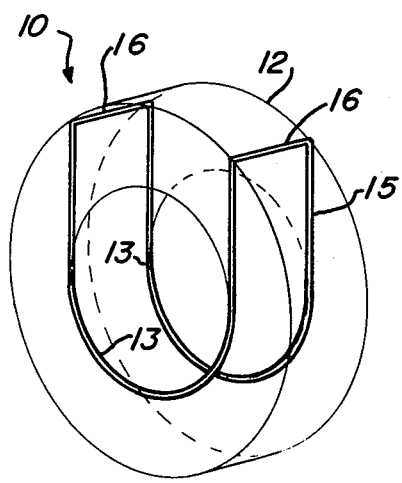
Fig_3
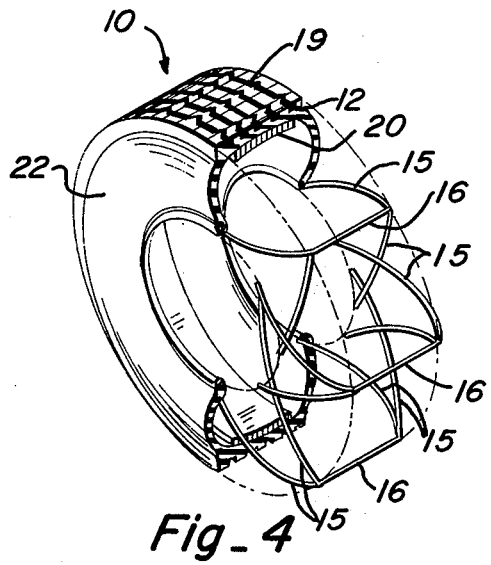
Fig_4
Fig_5

TIRE STRUCTURE AND METHOD

BACKGROUND OF THE INVENTION

1. Field of the Invention

The instant invention relates in general to an improvement in tire structure and method of programmed transmission of power through tires to, in such a manner, improve the interface of the tire with a supporting surface. More particularly, the instant invention pertains to the programmed transmission of torque from an inner annular member to an outer annular member to provide a favorable force couple between the contact of the tire tread on a supporting surface and an off vertical center location on the outer annular member to which the torque is applied.

2. Description of the Prior Art

Tire constructure, and materials for constructing tires, is a rather well-defined field. Classically, tires have been constructed of bias cord plies which join the tire bead at opposed angles between a normal direction to the bead to a tangential direction to the bead. The bias cord plies overlap in opposite directions and are cured with a rubber matrix to form a unitary, flexible structure. Cords may be constructed of, for instance, polymers, copolymers, fiber glass, steel or other such materials. The cords are pliable and extremely strong with regard to tensile strength. Thus, the cords lend strength to the tire construction and the binding rubber provides air impermeability and, in the tread area, traction and flexibility. A gas under pressure is contained within the tire carcass to prestress the cord areas of the tire thereby permitting the flexible tire structure to support substantial weight.

A more recent improvement is the bias-belted tire in which a tire constructed in the conventional bias ply fashion incorporates one or more belts under the tread area. As can be readily apreciated, the bias ply tires, with the cord plies running at opposed angles, tend to distort as the tire rolls and is deformed at the contact area. This imparts a scrubbing action to the tread area being distorted at the contact area of the ground and, accordingly, increases tire temperature and tire wear while compromising energy consumption and traction. In the bias-belted tire, the belts serve to minimize the scrubbing in the tread area by stabilizing the dimensions of the contact patch.

In perhaps the ultimate currently available tire, one or more plies of cord running in directions normal to the bear are utilized in conjunction with a belted annular area under the tread. This radial tire construction not only provides the stabilizing influence of the belt under the tread, but also provides a cord construction which readily deflects in the sidewall portion to accommodate deformation of the tire at the contact patch. By accommodating this deformation in the more flexible sidewalls, a particularly stable tread area can be provided.

In all of the above-mentioned constructions, torque is transmitted from the rim to the tread area through the unitary flexible sidewall construction. Thus, torque transmission is in the manner of the traditional wheel and axle in which a torque moment from the center of rotation to the periphery of the outer surface of the tire exists. The weight component is transmitted radially between the center of rotation and, on the average, the center of the contact patch in a vertical fashion. Thus, whatever the construction or material in the above-discussed conventional tire designs, torque and weight are both transmitted essentially through a vertical diameter from the bottom of the wheel, or other contact point of the wheel with the supporting surface, and the center of the wheel.

SUMMARY OF THE INVENTION

The instant invention includes, in addition to the conventional structure of a tire, be it bias ply, bias belted or radial, a network of elongated connecting members of cords or wires which programmably transmit weight forces and torque forces substantially independently of the remainder of the tire carcass. Basically, the networks exist between an annular member towards the inner surface of the tire, preferably in the bead area, and an outer annular member preferably in the tread area. The elongated connecting members run through both sidewalls of the tire but are free to move independent of the sidewalls. Preferably, the elongated connecting members are incorporated internally in the tire carcass, though an external network would also function. As a result of the characteristic of the elongated connecting members of not transmitting forces in compression but only in tension, and as a result of the deformation of the tire at the contact patch of the tire with a surface, only the elongated connecting members in the upper portion of the tire support substantial portions of the weight imposed upon the tire. In a fashion, the bead area can be thought of as being suspended from the upper portion of the tread area. This is possible because of the prestressing of the conventional sidewall as a result of the inflation gas which maintains the tread area away from the bead area. The support of the bead area by the tread area is, in a static condition, usually symmetrical. However, when a torque is applied between the bead area and the tread area, as in the instance when the tire is driving or braking a vehicle, the elongated connecting members transmit the torque in a selective programmed manner. This permits the bead, when power is applied to the wheel through an axle, to pull on the tread at positions offset from the vertical diameter of the wheel. By thus pulling on the tread, force is transferred and applied to the tread offset from the vertical diameter of the wheel in an upper quadrant of the wheel. With an instantaneous center of rotation of the tire existing at the contact patch, and with the force applied to the tread at a point offset from the vertical diameter through the contact patch, a force couple tending to rotate the tire exists. This force couple is more advantageous than the normal torque arm applied form the center of a wheel to the periphery.

Accordingly, it is an object of this invention to provide an improved method and structure for transmitting torque by means of a tire in a particularly advantageous manner.

Another object of this invention is to provide an improved method and structure which enhances the traction between a tire and a supporting surface.

Yet another object of the present invention is to provide an improved tire structure and method which provides more efficient energy transmission through the tire.

Still another object of the present invention is to provide an improved method and structure which increases the braking power of a tire.

These and other objects and advantages of the present invention will be evident from the following detailed description when read in conjunction with the accompanying drawings which illustrate various preferred embodiments of the invention.

BRIEF DESCRIPTION OF THE DRAWINGS

In the drawings:

FIG. 1 is a simplified schematic representation of the structure of the instant invention included in the sidewall of a tire;

FIG. 2 is a simplified representation of the force elements of one portion of the structure of the instant invention;

FIG. 3 is a simplified perspective view of a particularly preferred construction of the instant invention;

FIG. 4 is a partially cutaway perspective view of a tire according to the instant invention; and FIG. 5 is a representation of a cross section of an elongated connecting member according to the instant invention.

DETAILED DESCRIPTION OF THE INVENTION

Turning now to the drawings, wherein like components are designated by like reference numerals throughout the various figures whether representative, depictive or other presentation, a tire, including the supplementary structure of the instant invention, is illustrated in FIG. 1 and generally designated by the reference numeral 10. Tire 10 includes an outer annular member 12, an inner annular member 13, and a plurality of elongated connecting members 15 attached securely to outer annular member 12, and inner annular member 13, but, otherwise, independent of tire 10 along the length of elongated connecting members 15.

In a preferred embodiment of the invention, elongated connecting members 15 are positioned symmetrically throughout tire 10 and joined at a common apex at outer annular member 12. However, assuming the counterclockwise direction to be an acceleration or power mode while the clockwise is assumed to be a braking mode, it will be noted that elongated connecting members 15 labeled C, C', D, D', E, E', F, F' and G will essentially be in a compression force configuration as illustrated in FIG. 1. With a counterclockwise torque applied to inner annular member 13, elongated connecting members 15 labeled A and H will primarily bear the load between outer annular member 12 and inner annular member 13. Accordingly, at the apex of elongated connecting members 15 labeled H and H', and at the apex of elongated connecting members 15 labeled A and A', a load will be applied to outer annular member 12 with the greater portion of the load applied at the former location. This will induce, in effect, a weight applied to the apex of elongated connecting members 15 labeled H and H', as shown in FIG. 2. If this apex is envisioned as supplying a weight at such location, it will be recognized that this weight, or force, is off-center from the contact patch or footprint of tire 10 at the apex of elongated connecting members 15 labeled E and E'. Accordingly, the loading will induce a rolling motion to tire 10.

In essence, elongated connecting members 15 labeled A through H selectively and sequentially supply the force between outer annular member 12 and inner annular member 13 in the acceleration mode, while elongated connecting members 15 labeled A' through H' are in a similar manner—but opposite in sense—employed to impart a braking moment to tire 10. A braking force will, of course, be applied in the quadrant occupied by the apex of elongated connecting members 15 labeled B and B'.

FIG. 2 more specifically represents the dynamic situation in which an acceleration torque is applied to the apex of elongated connecting members 15 labeled H and H'. Force $F_1$ is applied to the footprint of the tire 10 in a direction through the center of rotation of tire 10. Force $F_2$ is applied at the terminus of elongated connecting member 15 labeled H at the outer annular member 12 when resolved into the effective driving force, and thus provides a non-aligned force which imports a force couple or turning force to tire 10. This method of turning tire 10 in effect transfers a portion of the weight applied to the axle (not shown) to which tire 10 is attached to a position on the periphery, or more specifically on outer annular member 12, which is outside of and offset from the vertical diameter through the center of tire 10. By offsetting such weight, or force $F_2$, a more favorable method of applying torque to tire 10 is accomplished.

While, as will be described below, inner annular member 13 is preferably attached to the tire bead area as illustrated in FIG. 1, an offset area as shown as inner annular member 13' in ghosted fashion may be utilized, particularly in the instance of recapped tires. In essence, inner annular member 13' is a secondary bead construction which serves to transfer loading through elongated connecting members 15 to outer annular member 12. Other structures which provide for force isolation through elongated connecting members 15 could be employed.

A particularly advantageous construction for incorporating elongated connecting members 15 into tire 10 is illustrated in FIG. 3. In this embodiment, a length of wire or cord material is attached for more than 90° to inner annular member 13, preferably at the bead area for strength, then extended as elongated connecting members 15 to outer annular member 12, across outer annular member 12 as tread connector 16, which may be either independent and movable through outer annular member 12 as elongated connecting members 15 are in tire 10, or may be attached to outer annular member 12. Thereafter, the strand or wire again extends as an elongated connecting member 15 through the other sidewall of tire 10 to inner annular member 13, attaches to inner annular member 13 for more than 90°, and repeats the extension as elongated connecting member 15 and crossover as tread connector 16 to close the configuration upon itself. Both the attachment over 90° to inner annular member 13, and the attachment of tread connector 16 to or through outer annular member 12 is extremely strong and susceptible to formation by automated means. A number of such windings will provide the required number of elongated connecting members 15 in a proper orientation and configuration. While elongated connecting members 15 are shown essentially in the preferred tangential interface with inner annular member 13, there is no need for such a configuration provided the elongated connecting members 15 may move independently of tire 10 to directly connect outer annular member 12 and inner annular member 13. Though not preferred, elongated connecting members 15 may connect out annular member 12 and inner annular member 13 in configuration approaching radia, but the desired result diminishes. The elongated connecting members transferring the force is preferably parallel to but offset from the vertical diameter of tire 10.

A more complete representation of tire 10 according to the instant invention is set forth in FIG. 4. In the cutaway portion of FIG. 4, it will be apparent that elongated connecting members 15 are arranged between outer annular member 12 and inner annular member 13 in a configuration as described with regard to the previous drawings. The location of tread connector 16 is similarly as previously described. However, it will be more readily apparent that inner annular member 13 is, in fact, a continuation of bead 18 while outer annular member 12 is closely associated with tread 19. For purposes of strength, stability and to more readily define outer annular member 12, it is preferred, but not required, that belt 20 be provided below tread 19. In addition to the usual tread stabilizing function of belt 20, an improved structural interface between elongated connecting members 15 and outer annular member 12 is afforded. Again, it is to be understood that the location of outer annular member 12 and inner annular member 13 adjacent, respectively, tread 19 and bead 18 is merely a preferred embodiment and such areas may be provided spaced from belt 30 and tread 19 provided that some radial spacing between outer annular member 12 and inner annular member 13 is provided through which elongated connecting members 15 may extend. Also, while elongated connecting members 15 are shown as straight-line representation in the previous figures, it will, of course, be understood that, in fact, such elongated connecting members 15 conform to the curvature of sidewall 22 of tire 10 as shown in FIG. 4.

A particularly preferred embodiment of elongated connecting members 15 is shown in cross section in FIG. 5. As shown, a cord member 25 is provided inside a sleeve 26, preferably of nylon for toughness and lubricity, with an outer coating 27 of relatively soft rubber to attach sleeve 26 to the rubber of the tire carcass. Accordingly, cord 25 is free to move within sleeve 26 and does not impart loads to the sidewall structure of tire 10 though sleeve 26 is attached to tire 10 by means of interfacing rubber 27. In this manner, elongated connecting members 15 may be integral with the construction of tire 10 but, by means of cord 25, may apply loads from outer annular member 12 from inner annular member 13 as a result of the independent movement of cord 25 inside sleeve 26.

Summarily, the instant invention comprises a means and method for selectively applying a force in a leading upper quadrant with regard to the desired application of power to a wheel. By producing a tire which programmably applies the force to such location, which is off the center line vertical diameter of the tire, a force couple is constantly applied which imparts a particularly favorable rotation to the wheel. The force is, in essence, a transfer of a certain portion of the weight applied to the tire through the axle to an off-center location in an upper quadrant. Such transfer of force, in addition to tending to roll the wheel, lessens the force applied at the footprint and somewhat diminishes the deformation at the footprint under dynamic, power application or braking conditions.

Although only limited preferred embodiments of the present invention have been illustrated and described, it is anticipated that various changes and modifications will be readily apparent to those skilled in the art, and that such changes may be made without departing from the scope of the invention as defined by the following claims.

What is claimed is:

1. A pneumatic tire structure, comprising: a tread, sidewalls extending from the tread and defining an inner annular opening, an inner annular member, an outer annular member positioned radially outwardly of and symmetrically with the inner annular member, and a plurality of elongated connecting members extending through and within the sidewalls but movable independently thereof to connect the inner annular member to the outer annular member for transfer of forces through tension of the elongated connecting members and, accordingly, between the inner annular member and the outer annular member.

2. A tire structure as claimed in claim 1 wherein the outer annular member is adjacent the tread.

3. A tire structure as claimed in claim 2 wherein the outer annular member is in the form of a belt spaced radially inwardly of the tread.

4. A tire structure as claimed in claim 2 wherein the inner annular member forms the tire bead.

5. A tire structure as claimed in claim 2 wherein the inner annular member is positioned essentially concentric with but radially outwardly of the inner annular opening.

6. A method of advantageously applying torque to a tire, comprising: applying a relative torque between an inner annular member of a tire and an outer annular member, deforming the tire from a circular configuration by means of a weight force applied to a contact patch between the tire and a supporting surface, transmitting forces between the inner annular member and the outer annular member by means of elongated connecting members extending through the tire sidewalls but movable independent of the tire sidewalls, utilizing the tire deformation to selectively and sequentially tension only elongated connecting members connected to the outer annular member at a point offset from the vertical diameter of the tire, and imparting rotational forces to the tire by means of such offset force and the force imposed through the vertical diameter at the contact area of the tire with the supporting surface, whereby a rotary motion is imparted to the tire by the force couple.

7. In combination with a tire having conventional tread, sidewall and bead, a structure for improved transfer of forces and weight, comprising:
an inner annular member secured to the tire, an outer annular member secured to the tire and spaced radially outward from the inner annular member, a plurality of elongated connecting members, each comprising a sleeve and a flexible cord extending freely through the sleeve, secured within the tire sidewalls to permit transfer of forces through the cord, the flexible cords being secured at one end to the inner annular member and at the other end being secured to the outer annular member, whereby, as a result of weight and torque transfer the inner annular member and the outer annular member, forces tending to rotate the tire in a particular advantageous manner on a supporting surface are generated at the outer annular member.

* * * * *

UNITED STATES PATENT OFFICE
CERTIFICATE OF CORRECTION

PATENT NO. : 3,982,576

DATED : September 28, 1976

INVENTOR(S) : Henry Replin

It is certified that error appears in the above-identified patent and that said Letters Patent are hereby corrected as shown below:

Column 2, line 51, correct "form" to --from--.

Column 5, line 22, correct "30" to --20--.

Signed and Sealed this

Fourteenth Day of December 1976

[SEAL]

Attest:

RUTH C. MASON
Attesting Officer

C. MARSHALL DANN
Commissioner of Patents and Trademarks